March 24, 1964   J. MEISLER   3,126,266
HYDROGEN AND HELIUM SEPARATION AND PURIFICATION
Filed Aug. 18, 1959   5 Sheets-Sheet 1

INVENTOR.
JOSEPH MEISLER
BY
Frank R. Dunfon
AGENT

INVENTOR.
JOSEPH MEISLER
BY
AGENT

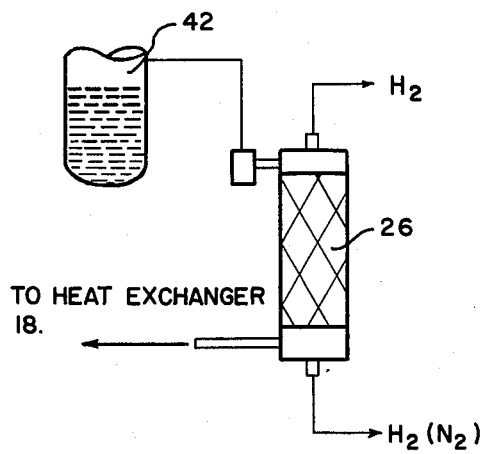
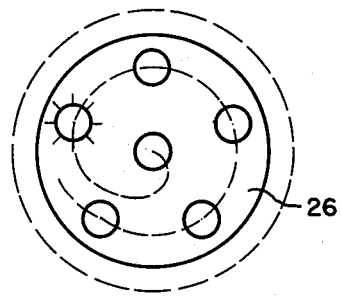
Fig. 4      Fig. 4a
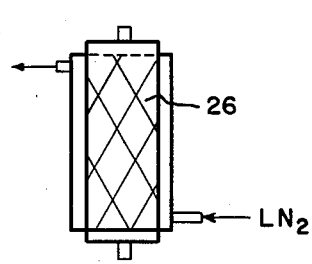
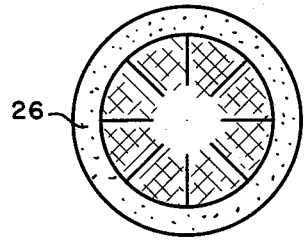
Fig. 5      Fig. 5a
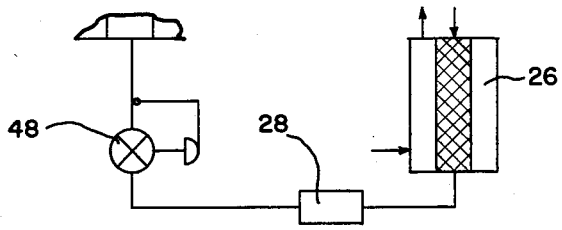
Fig. 7
*INVENTOR.*
JOSEPH MEISLER
BY
AGENT March 24, 1964 J. MEISLER 3,126,266
HYDROGEN AND HELIUM SEPARATION AND PURIFICATION
Filed Aug. 18, 1959 5 Sheets-Sheet 5

INVENTOR.
JOSEPH MEISLER
BY
AGENT

United States Patent Office 3,126,266
Patented Mar. 24, 1964

3,126,266
HYDROGEN AND HELIUM SEPARATION AND PURIFICATION
Joseph Meisler, New York, N.Y., assignor to North American Philips Company, Inc., New York, N.Y., a corporation of Delaware
Filed Aug. 18, 1959, Ser. No. 834,595
3 Claims. (Cl. 62—18)

This invention relates to a method and apparatus for separating hydrogen in a state of high purity from a dissociated ammonia gas mixture consisting of hydrogen, nitrogen and traces of ammonia by use of an extremely low temperature cold source.

An object of the present invention is to maintain the present apparatus in continuous operation at a high $H_2$ recovery efficiency and with minimum refrigeration requirements.

Another object of the present invention is to separate out the nitrogen in the mixture in a state of high purity, either as a gas or a liquid.

A further object of the present invention is to maintain the purity of the products at a high level in accordance with specified requirements.

Another object of the present invention is to provide a system for separation and purification of hydrogen from dissociated ammonia gas which requires little or no "down time."

A further object of the present invention is to provide a system whereby substantially pure hydrogen is separated out by means of cryogenic cooling of the mixture below 130° Rankine, and the subsequent purification of the hyrogen product by adsorptive decontamination of the residual nitrogen.

Another object of the present invention is the provision of a fast cool-down system which immediately after defrosting can be flooded with $N_2$.

A still further object of the present invention is the utilization of a cryogenic closed circuit which will effect the separation and purification of hydrogen and will incorporate the use of an internally closed nitrogen condensing cycle including a cold gas refrigerator operating at 140° R. and lower as set forth in U.S. Patent No. 2,700,109 to Jonkers et al., issued November 13, 1956.

It should be apparent that the present invention is not to be limited to hydrogen and nitrogen as found in dissociated ammonia gas. But on the other hand, the present system may be applied to all binary gas mixtures and many multicomponent gas mixtures which consist of compounds having widely divergent boiling temperatures and which exhibit a minimum of mutual solubility in the liquid phase. Some of these mixtures are: helium-methane; hydrogen-methane; helium-nitrogen; and hydrogen-ethylene.

The above and other features, objects and advantages of the present invention will be fully understood from the following description considered in connection with the accompanying illustrative drawings.

Figure 3:
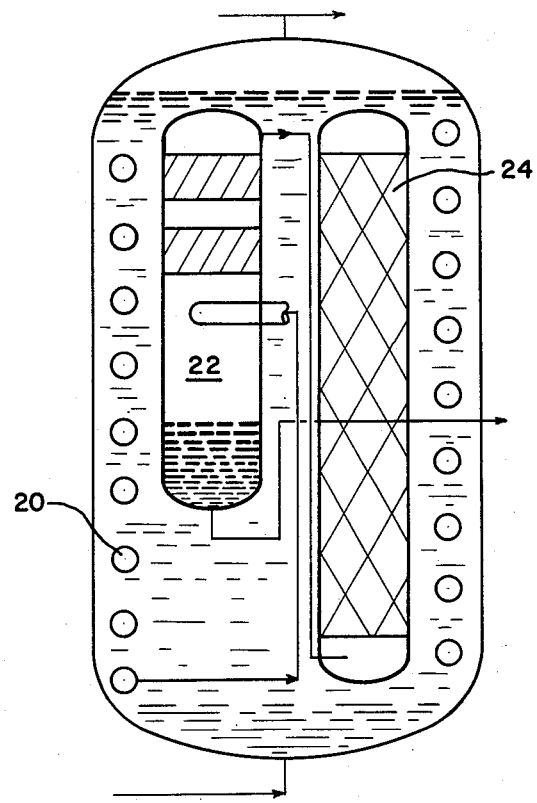
Figure 3A:
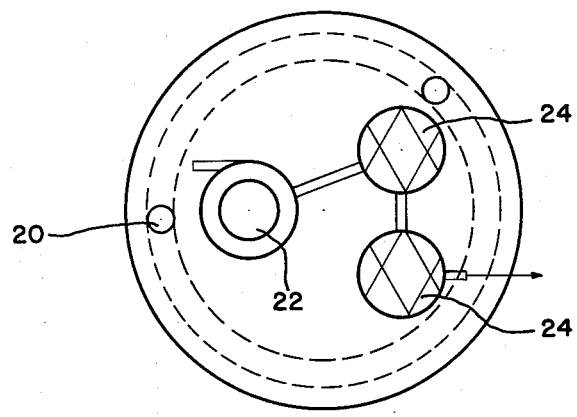
Figure 6:
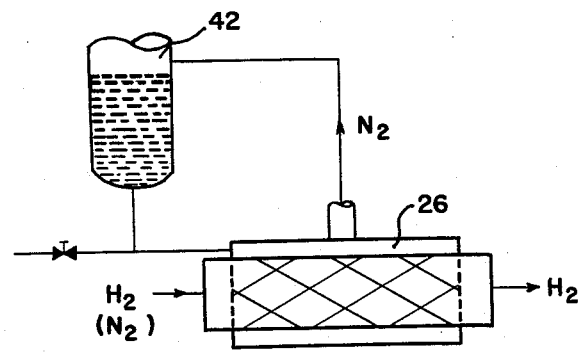
Figure 6A:
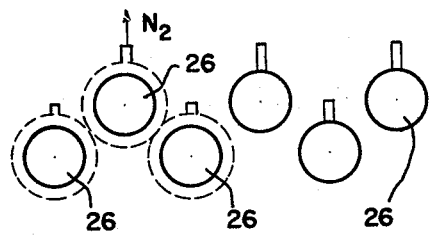
Figure 6B:
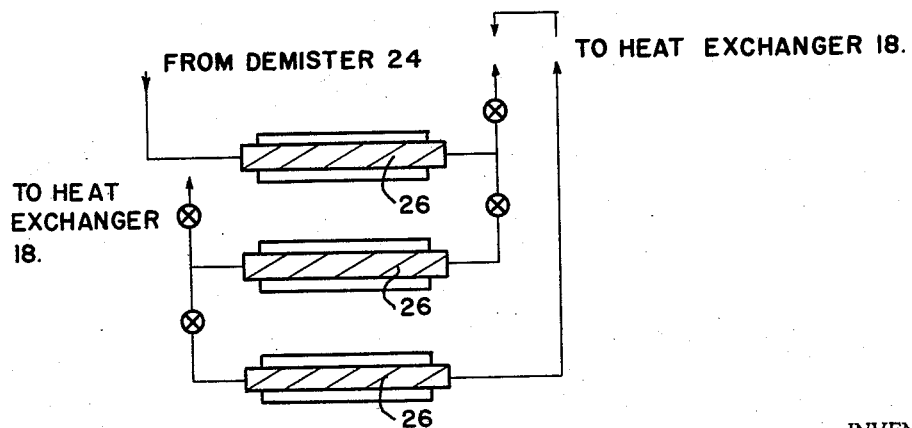

FIG. 3 is a sectional view of the demister and the adjacent centrifugal separator, FIG. 3a is a view taken along lines 3a—3a of FIG. 3, FIG. 4 is a partial schematic view of the liquid level surge tank and adsorber, FIG. 4a is a sectional view of FIG. 4, FIG. 5 is a diagrammatic view of an alternate construction of the adsorber, FIG. 5a is a sectional view taken on the lines 5a—5a of FIG. 5, FIG. 6 is a diagrammatic view of another alternative construction of the adsorber, FIG. 6a is a view showing the horizontal arrangement of the adsorbers, FIG. 6b is another arrangement of the absorbers for product purity control and FIG. 7 is a partial flow diagram of an arrangement which produces a low pressure hydrogen product.

Figure 1:
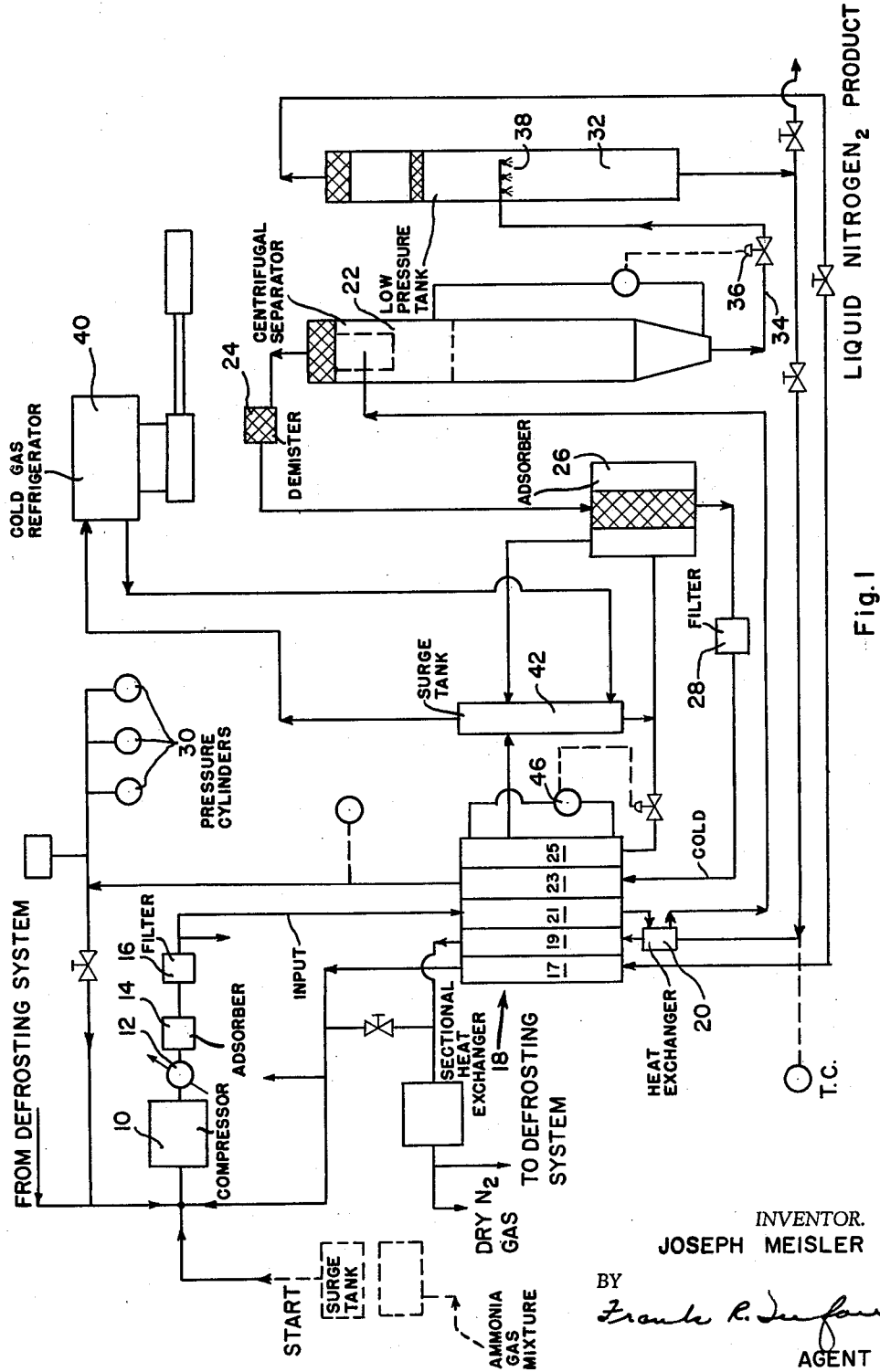
FIG. 1 is a diagrammatic, flow sheet view of the apparatus method of the present invention.
Figure 2:
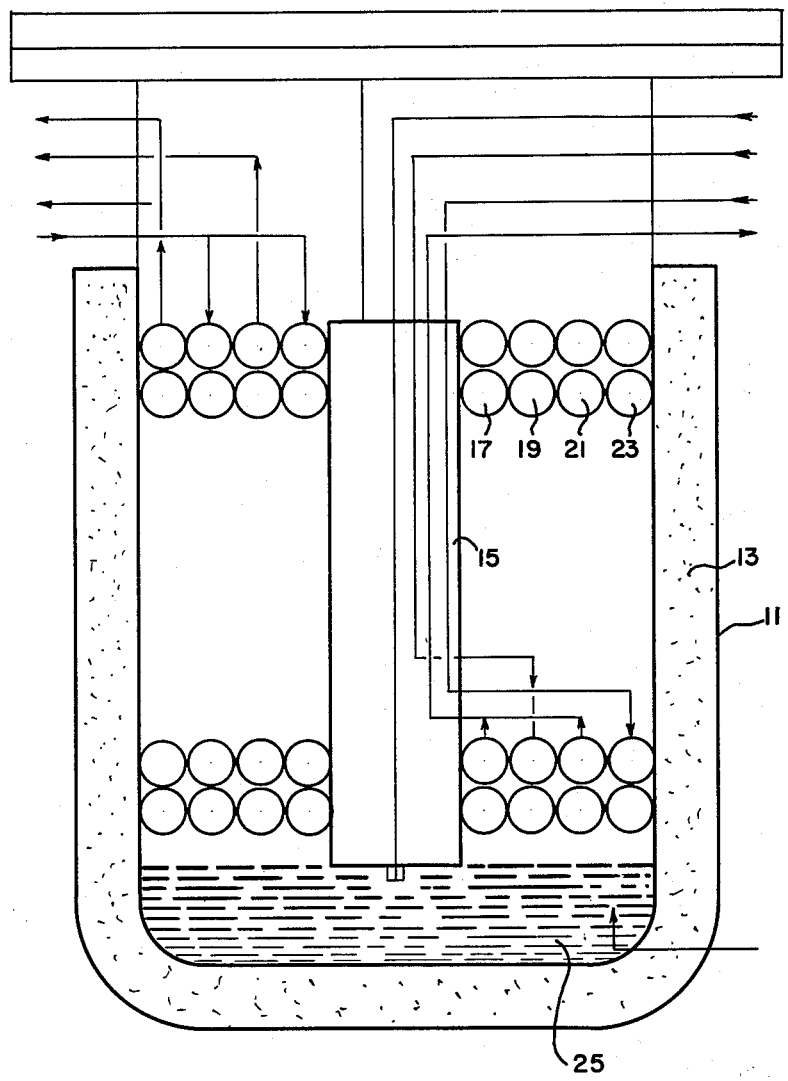
FIG. 2 is a cross-sectional view of the main heat exchanger in the present system.

Referring to the drawings and more particularly to FIG. 1 thereof, dissociated ammonia gas, for example, consisting of three parts of $H_2$ and one part of $N_2$ and traces of unreacted ammonia is fed into compressor 10 and compressed to a pressure in the range of 40 to 70 atmospheres. The compressed gas is then fed into heat exchanger 12 and cooled to about 90° F. Thereafter the compressed gas mixture is fed into absorber 14. The adsorber 14 contains a special solid type absorbent to remove traces of undissociated ammonia. The clean gas is then passed through filter 16 and conducted into a countercurrent, multi-pass, multi-coil type heat exchanger 18 at section 21 thereof. FIG. 2 illustrates a cross-section view of heat exchanger 18, and as clearly seen in that figure, the heat exchanger 18 comprises an enclosure in the form of a Dewar tank 11 having Dewar insulation 13 and is provided with a central core element 15 having a plurality of surrounding coils 17, 19, 21 and 23. Each of the coils corresponds to the sections identified in the heat exchanger 18 in FIG. 1. The bottom trough 25 of the heat exchanger 18 is filled with a varying amount of liquid nitrogen dependent upon the operation of liquid level controller, and will be more fully explained hereinafter. Moreover, each of the coils is connected to a feed line and an exit line as shown in both FIG. 1 and 2.

The gas mixture feed is cooled in heat exchanger 18 to about 150° Rankine temperature in heat exchange with the component gases of the feed mixture that have been separated in the process. The cooled feed mixture in section 21 of heat exchanger 18 containing most of the nitrogen component in a condensed state is drawn off and directed to heat exchanger 20 wherein additional nitrogen condensation is effected and the nitrogen component in a condensed state is further cooled by sub-atmospheric boiling liquid nitrogen in heat exchanger 20. The mixture is then passed into centrifugal separator 22 where the liquid nitrogen condensate is separated from the residual hydrogen-nitrogen uncondensed gases.

In centrifugal separator 22 the overhead stream consisting of $H_2$ saturated with $N_2$ gas at low temperature and high pressure is fed through demister 24 where the gas is stripped of entrained $LN_2$. The construction of demister 24 is more particularly illustrated in FIGS. 3, 4 and 5 respectively. The overhead hydrogen gas which is saturated with a small amount of nitrogen is thereafter conducted into adsorber 26 where it traverses an efficient solid adsorbent material that is maintained at boiling $LN_2$ temperature and which is highly preferential toward the residual nitrogen gas. FIGURES 5, 5a, 6, 6a and 6b illustrate novel methods of adsorber contact surface arrangement for obtaining and controlling the degree of decontamination of the overhead $H_2$ gas from nitrogen.

The hydrogen gas leaving the adsorber 26 decontaminated of nitrogen passes through filter 28 and is warmed to ambient temperature in heat exchange with the warm feed gas mixture in heat exchanger 18. The warmed hydrogen gas, which is conducted through section 23 of the heat exchanger 18 may be stored in pressure cylinders 30. It should be noted, however, that where low pressure hydrogen is required the dry gas stream from filter 28 may be reduced in pressure in a Joule-Thompson throttling type expansion system 48 as seen in FIG. 7 thus, effecting a substantial lowering of the hydrogen stream temperature and producing an increased efficiency of the heat exchanger 18.

The liquid nitrogen bottoms in centrifugal separator 22 are flashed into low pressure tank 32 through line 34 and pressure reducing valve 36. The liquid entering tank 32 is forced through spray nozzle manifold 38 to effect a dispersion of the liquid into small droplets. This produces an efficient desorption of the dissolved $H_2$ contained in the liquid nitrogen, thus resulting in high purity liquid nitrogen bottoms in tank 32. The resultant hydrogen-nitrogen flash gas mixture in tank 32 is demisted and is fed back to heat exchanger 18 and warmed to ambient temperature therein and may be discarded to the atmosphere or recycled to the suction side of the feed compressor 10.

The bottoms product in tank 32 consists of high purity liquid nitrogen and is throttled to subatmospheric pressure on passing into heat exchanger 20 and the resultant temperature reduction in the liquid nitrogen is utilized for further cooling the feed mixture. The warmed and partially evaporated liquid nitrogen being conducted away from the heat exchanger 20 is passed through section 19 of heat exchanger 18 where it is completely evaporated and warmed to ambient temperature in heat exchange with the feed mixture, and thereafter discharged to the atmosphere or used as a nitrogen source of high purity.

The preferred refrigeration system incorporates a cold refrigerator nitrogen recondenser 40. It should be noted, however, that other types of refrigeration systems having an ultra-low temperature refrigerant may be satisfactorily employed with the present method and apparatus. The cold gas refrigerator nitrogen recondenser is preferably of the type described and illustrated in U.S. Patent No. 2,770,109 to Jonkers et al. The cold gas refrigerator 40 provides $LN_2$ to start the system in operation and to maintain it in continuous operation. The refrigerator maintains adsorber 26 submerged in a bath of liquid nitrogen and balances the thermal losses and heat effects due to nitrogen adsorption, thermal insulation losses, heat exchanger losses, etc. by a nitrogen liquid level and temperature control on heat exchanger 18. The construction of the latter will be set forth with more particularity hereinafter in FIG. 2. The nitrogen vapors generated in section 25 of heat exchanger 18 are added to the nitrogen vapors of adsorber 26 in the dome of surge tank 42 and are thereafter conducted to the condenser of the cold gas refrigerator 40 where they are liquefied and transferred back to surge tank 42 as a liquid. Thus, the refrigerator 40 is part of a closed cycle with the surge tank 42.

The efficiency of the separation process is controlled by the temperature of the feed leaving heat exchanger 20. This temperature is maintained close to the triple point temperature of boiling liquid by maintaining a low absolute pressure or high vacuum over the boiling liquid nitrogen in exchanger 20.

FIG. 3 illustrates the preferred arrangement of the centrifugal separator 22 together with a pair of demisters 24. It should be noted that the hydrogen gas coming from the separator 22 traverses the demisters 24 and thence is conducted on to the adsorber 26. Heat exchanger 20 surrounds both the separator 22 and demisters 24. As seen in FIG. 3a, the feed mixture is directed into the separator 22 in a tangential manner.

The purity of the hydrogen product is controlled by varying the contact surface of adsorber 26 as illustrated in FIGS. 4, 4a, 5, 5a, 6, 6a and 6b and as read on an indicator which is capable of determining small amounts of the nitrogen contaminant. The contact surface in FIGS. 4, 5 and 6 consists of an activated type molecular sieve adsorbent which may also be an activated charcoal or a silica gel contained at elevated pressure and cooled to liquid nitrogen temperature through the type of heat transfer surface shown in FIGS. 4a, 5a and 6b. The adsorber surface is grouped in multiple parallel arrangement so that one or more units can be tied into a series train when pure hydrogen production is required.

The optimal pressure range for a $H_2$—$N_2$ mixture is disclosed in article by Z. Dokoapil, C. Van Soest and M. D. P. Swenker in Applied Scientific Research (1955), sect. A, vol. 5, page 182, et seq., entitled "On the Equilibrium Between the Solid Phase and the Gas Phase of the Systems Hydrogen-Nitrogen, Hydrogen-Carbon Monoxide, and Hydrogen-Nitrogen-Carbon Monoxide.

FIG. 7 illustrates the cycle as shown in FIG. 1, but which system is modified to include a Joule-Thompson throttling type expansion system. In this regard, the line connecting adsorber 26 with the heat exchanger 18 has a filter 28 first in the line and then a Joule-Thompson valve 48. This arrangement reduces the pressure of the gas to thereby produce low pressure hydrogen gas.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What I claim is:

1. A method of separating out pure liquid nitrogen from a binary hydrogen-nitrogen gas mixture constituted of the products of the catalytic dissociation of ammonia at an elevated pressure in which the second component has a normal boiling temperature of not less than 140° R. comprising compressing said gas mixture, passing said compressed gas mixture through a heat exchanger and in contact with cold produced by an ultra low temperature cold gas refrigerator, passing said gas mixture through a centrifugal separator, passing the non-condensible hydrogen off-gas through a gas demister to separate the liquid nitrogen condensate from said non-condensible hydrogen off-gas, condensing out said second nitrogen component and decontaminating the residual, non-condensible hydrogen from traces of said component by contact with a preferential type absorbant, said liquid nitrogen being separated from the gaseous hydrogen by reducing the head pressure in the system and removing the resulting flash gas through separation passages, atomizing the liquid mixture into small liquid droplets to provide a consequent large disintrainment surface to thereby separate out a liquid nitrogen product in a substantially pure state, and removing the resultant liquid nitrogen as bottoms liquid nitrogen.

2. An apparatus for the separation of a mixture of gases into its components wherein one of said components is substantially pure liquid nitrogen comprising a compressor for compressing said gas mixture within the optimal pressure range of 40 to 70 atmospheres, a multi-coil heat exchanger for cooling the mixture to about 130° R. temperature or below and having a plurality of sections, a cold gas refrigerator, means interconnecting said compressor, heat exchanger and cold gas refrigerator whereby said compressed gas mixture is passed through one of the sections of said heat exchanger in contact with the cold produced by said cold gas refrigerator in another section of said heat exchanger to thereby condense out the pure component, an adsorber having a preferential type adsorbent for decontaminating the residual, non-condensible gas from traces of said pure gas, said pure gas being warmed to ambient temperature in said multi-coil heat exchanger, a centrifugal separator wherein the liquid nitrogen condensate is separated from the residual hydrogen-nitrogen uncondensed gas, means for connecting said separator to said heat exchanger and said preferential type adsorbent, a flash tank having a spray nozzle therein, conduit means connecting the bottom of said separator with said spray nozzle whereby said separator is in fluid communication with said flash tank, and means for supplying said mixture tangentially to said separator.

3. An apparatus for the separation of a mixture of gases into its components wherein one of said components is substantially pure liquid nitrogen and the other component is a hydrogen product comprising a compressor for compressing said gas mixture within the optimal pressure range of 40 to 70 atmospheres, a multi-coil heat exchanger for cooling the mixture to about 130° R. temperature or below and having a plurality of sections, a cold gas refrigerator, a surge tank in a closed circuit with said refrigerator, means interconnecting said compressor, heat exchanger and cold gas refrigerator whereby said compressed gas mixture is passed through one of the sections of said heat exchanger in contact with the cold produced by the cold gas refrigerator in another section of said heat exchanger to thereby condense out the pure component, an adsorber having a preferential type adsorbent for decontaminating the residual non-condensible gas from traces of said pure gas, said adsorbent being supplied cold from the surge tank, the latter being provided with nitrogen vapors from said heat exchanger and adsorber, a centrifugal separator wherein the liquid nitrogen condensate component is separated from the residual hydrogen-nitrogen uncondensed gas, means for connecting said separator to said heat exchanger and said preferential type adsorbent, a flash tank having a spray nozzle therein, conduit means connecting the bottom of said separator with said spray nozzle whereby said separator is in fluid communication with said flash tank, and means for reducing the hydrogen product of said mixture of gases.

References Cited in the file of this patent

UNITED STATES PATENTS

| | | |
|---|---|---|
| 1,292,958 | Norton | Jan. 28, 1919 |
| 1,891,125 | Gessel | Dec. 13, 1932 |
| 2,011,551 | Hasche | Aug. 13, 1935 |
| 2,070,098 | Twomey | Feb. 9, 1937 |
| 2,070,099 | Twomey | Feb. 9, 1937 |
| 2,411,186 | Boeckder | Nov. 19, 1946 |
| 2,448,491 | Latham | Aug. 31, 1948 |
| 2,696,088 | Twomey | Dec. 7, 1954 |
| 2,730,875 | Ranke | Jan. 17, 1956 |
| 2,831,549 | Alpert | Apr. 22, 1958 |
| 2,903,859 | Kahl | Sept. 15, 1959 |
| 2,919,556 | Mulder | Jan. 5, 1960 |
| 2,933,901 | Davison | Apr. 26, 1960 |
| 3,011,589 | Meyer | Dec. 5, 1961 |

OTHER REFERENCES

Bailey: "Some Aspects of Heavy-Water Production by Distillation of Hydrogen," published by Second United Nations International Conference on the Peaceful Uses of Atomic Energy, A/Conf. 15/P/1063 U.S.A., June 1958, paragraphs 2 and 2.2 relied on.

"Kelvin Scale" (Coombs et al.), published by Arthur D. Little, Inc., spring 1959, article on "Helium Recovery and Purification" relied on.

"Advances in Cryogenic Engineering," Volume III (Timmerhaus), published by Plenum Press, Inc. (New York), 1960, pages 11–13 of interest.